Nov. 24, 1964　　B. M. SCHIFFMAN　　3,158,811
ORTHOGONAL MODE WAVEGUIDE BALANCED MIXER CONTAINING
A DUMBBELL-SHAPED IRIS AND ATTENUATOR STRIP
Filed July 24, 1961
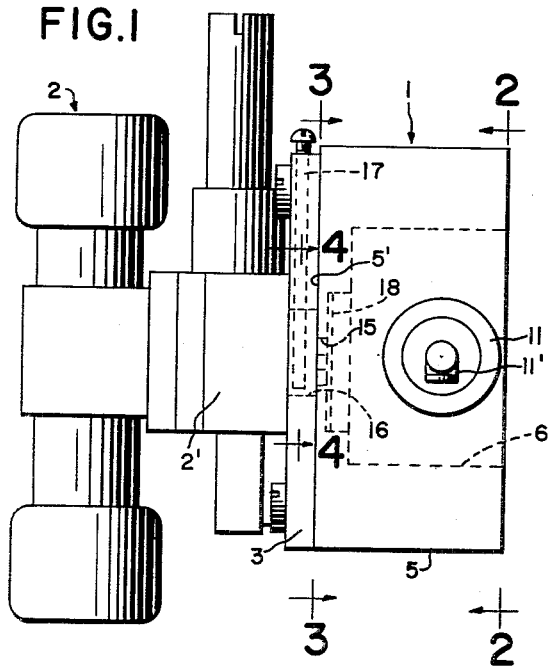
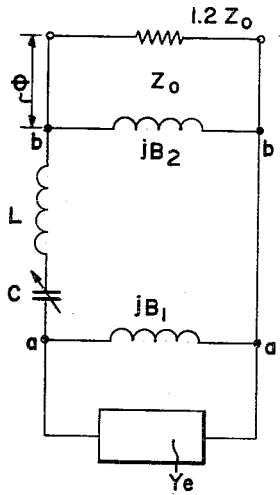
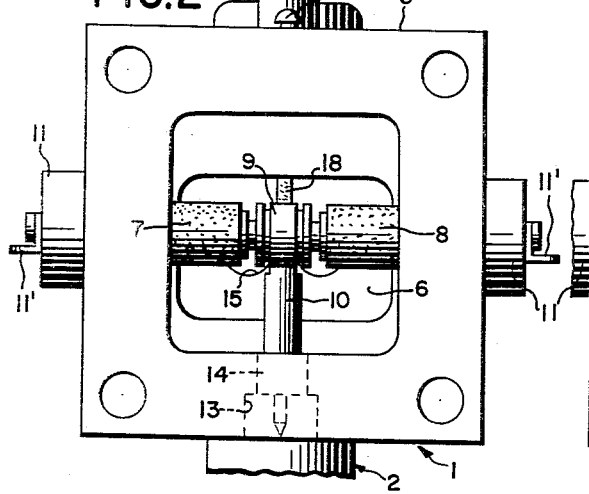
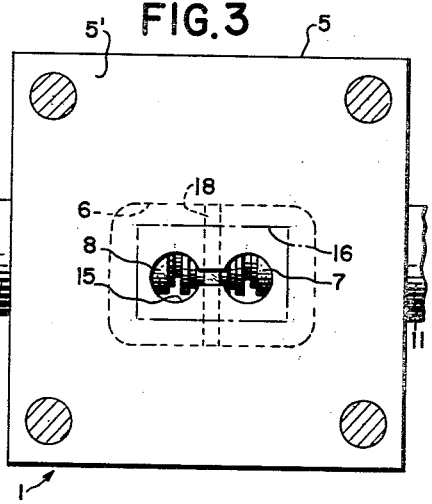
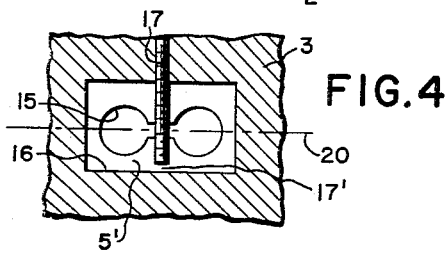
*INVENTOR.*
BERNARD M. SCHIFFMAN
BY
ATTORNEY United States Patent Office 3,158,811
Patented Nov. 24, 1964

3,158,811
ORTHOGONAL MODE WAVEGUIDE BALANCED MIXER CONTAINING A DUMBBELL-SHAPED IRIS AND ATTENUATOR STRIP
Bernard M. Schiffman, Mountain View, Calif., assignor to Varian Associates, Palo Alto, Calif., a corporation of California
Filed July 24, 1961, Ser. No. 126,034
14 Claims. (Cl. 325—446)

The present invention relates in general to microwave mixers of the type wherein the microwave frequency waves are supported as mutually orthogonal modes in a single waveguide, and more particularly to novel waveguide balanced mixer structures adapted for direct coupling to a klystron local oscillator.

In the co-pending patent application of Richard M. Whitehorn, Serial No. 862,356, filed December 28, 1959, issued as U.S. Patent 3,066,290 on November 27, 1962, there is disclosed and claimed a class of extremely compact and lightweight microwave mixers, comprising a single section of waveguide supporting two mutually orthogonal dominant transverse electric modes, respectively established by two microwave frequency waves, and having a pair of responsive means or diodes collinearly disposed therein. Means are provided for perturbing the electric field of one mode to couple to each diode in an opposite direction whereas the electric field of the other mode is unperturbed and couples to each diode in the same direction. Thus, the signals in the diode are combined to provide a balanced beat frequency output.

When using a local oscillator source (L.O.), for example a reflux klystron closely coupled to the mixer to supply an input frequency, it has heretofore been the practice to couple the L.O. power into the single waveguide section through a rectangular shaped iris excited in a first mode, and to supply the signal input into the single waveguide section through a rectangular waveguide in a second mode from the opposite side of the single waveguide section, the two fields within the single waveguide section being mutually perpendicular. An adjustable attenuator was positioned adjacent the rectangular shaped iris to regulate the amount of power from the L.O. to the mixer. Structures of this type, however, have several limitations, for example, there is a tendency for the klystron to operate in spurious modes and for the microwave mixer to pull the klystron off frequency. Also, diode crystal current varies widely over the tunable frequency range.

It is therefore the object of the present invention to provide a waveguide microwave mixer adapted for close coupling to a klystron L.O. which will prevent spurious modes of oscillation in the klystron.

The main feature of the present invention is the provision of a thin-wall dumbbell-shaped iris input for the L.O. frequency signal which eliminates spurious modes of oscillation within the klystron L.O. and reduces the variation in diode crystal current over the desired frequency range.

Another feature of the present invention is the provision of a fixed attenuator strip, placed across a portion of the dumbbell-shaped iris, which in conjunction with the iris attenuates the L.O. power to provide proper crystal drive while not attenuating the signal power nor adversely affecting the klystron oscillations.

These and other features and advantages of the present invention will become more apparent after a perusal of the following specification taken in connection with the accompanying drawings wherein, FIG. 1 is a side view of a waveguide microwave mixer closely coupled to a klystron in accordance with the principles of the present invention, FIG. 2 is a view of the waveguide microwave mixer of FIG. 1 taken at lines 2—2 in the direction of the arrows, FIG. 3 is a view of the waveguide microwave mixer of FIG. 1 taken along lines 3—3 in the direction of the arrows, FIG. 4 is a fragmentary view of FIG. 1 taken at line 4—4 in the direction of the arrows, and FIG. 5 shows in schematic form the electrical circuit of a klystron closely coupled to a mixer.

Referring now to the drawings there is shown a waveguide microwave mixer 1 closely coupled to a reflex klystron L.O. 2 by mating a flange member 3, provided on the external cavity 2' of klystron 2, to mixer 1. The reflex klystron 2 may, for example, be model VA-217, manufactured by Varian Associates of Palo Alto, California. The mixer 1 comprises a rectangular metallic waveguide section 5 having a thin end wall 5', forming a mixer cavity 6. A pair of responsive means, such as collinearly disposed crystal diode rectifiers 7 and 8 are positioned within mixer cavity 6 and are connected in series by a connector 9, connecting the oppositely poled, inwardly extending terminals of the diode rectifiers 7 and 8. A pair of removable caps 11 threaded through the side walls of waveguide section 5, support diode rectifiers 7 and 8 within mixer cavity 6. An output post 10 extends vertically from connector 9 for coupling the output intermediate frequency (I.F.) signal out of the mixer cavity 6 through an aperture 13 in a side wall of mixer 5. An insulator 14 insulates output post 10 from the wall of waveguide section 5 while by-passing the microwave frequency fields. A dumbbell-shaped iris 15 is provided, as by machining, into the otherwise solid, thin, end wall 5', opposite the signal input opening of the mixer 5. A rectangular shaped output window 16 couples the output frequency from klystron 2 through iris 15. A coupling screw 17 extends into the opening of output window 16, forming a reactive coupling gap 17', to provide L.O. coupling. The longitudinal axis 20 of dumbbell-shaped iris 15 is positioned slightly off center with respect to output window 16, in the direction of coupling gap 17'. As an example, for a mixer waveguide 5 in the order of 1.725 inches square, the narrow portion of the iris 15 will be 0.032 inch across and the iris is off-centered 0.050±0.005 inches in the direction of the coupling gap 17'. An attenuator strip 18 is positioned across the center of iris 15 to reduce the crystal current due to the L.O. input power and also aids in reduction of spurious modes of oscillation in the L.O. as will be subsequently explained. Attenuator strip 18 is approximately 1/16 inches wide and is made of, for example, mica, metalized with a thin film of, for example, platinum. The thickness of the platinum is less than the skin thickness to appear lossy.

The rectangular L.O. iris 16 provides a high value of shunt susceptance $jB_2$ near the plane 3—3 of FIG. 1 thus properly terminating the klystron resonant cavity while at the same time, permitting the desired amount of power to be coupled to the load which is normally connected to the klystron via a rectangular waveguide. Under this condition the klystron will oscillate and couple power in a more or less uniform manner even to a slightly imperfect waveguide load, for example, a load of VSWR 1.2 of any phase. This is illustrated schematically in FIG. 5 where the klystron external tuning cavity 2' is represented by a variable capacitance C and an inductance L. On the left, the klystron body 2 is represented by a shunt element $jB_1$ (internal coupling) and a shunt susceptance $Ye$ which includes all the internal structure of the klystron including a non-linear negative resistance, referred to terminals a—a. On the right at terminal b—b we have a shunt susceptance $jB_2$ (the external iris), and following this a length of connecting waveguide of arbitrary electrical length $\theta$, characteristic impedance $Zo$, and finally a load resistance of value no greater than $1.2\ Zo$.

We now may observe that if the iris shunt susceptance $jB_2$ is further increased, the klystron will continue to oscillate essentially as before yet it will couple less power to the load while at the same time the klystron will become more or less free of the effect of the load on certain klystron operating characteristics. The coupling iris may not however be made too small or spurious oscillations of the klystron will occur due to an unloading of low frequency modes. These klystron characteristics include modulation sensitivity, tuner position vs. reflector voltage range between half power points, and frequency vs. tuner position curve. In particular, the linearity of the frequency vs. tuner positive curve are left essentially unchanged from that which we obtain when the klystron is coupling power into a waveguide load of VSWR<1.2. By utilizing the above principle, a microwave mixer may be close coupled to a klystron, and in fact, such an increase in the value of $jB_2$ was made in a previous model of the klystron-microwave mixer combination for this very purpose. Close coupling was obtained by means of an iris in a thick wall on the mixer; however, stability with regard to suppression of spurious modes was not obtainable because of the sensitivity of the load characteristics with respect to the position of an interposed movable attenuator card positioned in a slot cut on the external side of the thick wall. This condition of instability was aggravated by the presence of propagating modes in the dielectric-filled attenuator card slot. In contrast, the iris design of the present invention is free of such perturbing influences as a movable card. When placed near plane $b$—$b$ of FIG. 5, the new iris provides a stable increase in the shunt susceptance $jB_2$. The klystron is thus negligibly affected by whatever load the mixer presents at terminals $b$—$b$ (plane 3—3 of FIG. 1).

Freedom from spurious modes is normally effected by internally and externally loading down these modes. Such an external loading for certain low frequency modes is here obtained by properly placing the thin walled dumbbell-shaped mixer iris relative to the coupling screw end, thus loading down these undesired modes produced by the attenuator card and following mixer crystals. It is noted that certain positions favor spurious mode-free operation while others produce spurious modes. The iris opening of the mixer may not be arbitrarily positioned (although more than one position is possible in this respect). While the variability of a movable attenuator card is eliminated, a resulting gain in repeatability with respect to spurious mode-free operation of the mixer-klystron combination is realized.

Freedom from unwanted radiation is effected by eliminating openings between flanges and in filling the groove wherein the slidable attenuator was previously held with solid metal. An additional advantage is obtained by eliminating the groove and placing the attenuator strip on the inner cavity, so that the wall can be made much thinner.

During operation of the mixer-klystron, a signal is coupled into mixer cavity 6 through the intermediary of a rectangular waveguide (not shown) via the opening in the front of the mixer opposite thin wall 5′. The waveguide will be positioned with respect to the mixer 5 such that the signal electric field will excite within mixer cavity 6 a dominant transverse electric mode having an E-field parallel to the axis of crystal diodes 7 and 8. The input from the klystron L.O. 2 is transmitted into the cavity 6 via dumbbell-shaped iris 15. The iris 15 is parallel to the E-field of the signal an dnormal to the E-field of the L.O. power from the klystron. The L.O. electric field will excite a dominant transverse electric mode within cavity 6 which is polarized orthogonal to the signal field. This L.O. electric field is perturbed by the I.F. post 10 such that a portion of the L.O. electric field will couple to each diode rectifier in an opposite direction. The difference between the I.F. currents in the separate diode rectifiers flows along the conductor 10 through a low pass insulating choke 14 in the waveguide wall to the inner coaxial conductor of an I.F. output line, the I.F. current components of the separate crystal rectifiers due to L.O. noise cancel each other at the junction 9 of post 10. Each cap 11 is provided with a filter network (not shown) bypassing the A.C. crystal current components to the grounded mixer so that the D.C. current levels in the crystal rectifier may be monitored at lugs 11′ mounted on caps 11 without producing undesired leakage fields.

Certain possible modifications of the present invention should be particularly noted. Since mixers of the present invention are reciprocal hybrid devices, the functions of the various terminals may, under suitable conditions, be reversed. For example, a carrier signal could be fed in through the dumbbell-shaped iris and the device operated as a modulator by impressing the modulating signal on the R.F. terminal and extracting the output through the opposite waveguide port. Also, the mixer could be operated as a parametric amplifier by using voltage controlled diode capacitors instead of dissipative diode rectifiers.

Since many changes would be made in the above construction and many apparently widely different embodiments of this inevntion could be made without departing from the scope thereof, it is intended that all matter contained in the above construction or shown in the accompanying drawings shall be interpreted as illustrative and not in a limiting sense.

What is claimed is:

1. In a waveguide hybrid junction; a waveguide section capable of supporting a pair of orthogonally polarized dominant transverse electric waveguide modes established by first and second waves propagating, respectively, through a pair of junction connections adjoining said section, the junction connection for said first wave including a dumbbell-shaped iris; an attenuator means positioned across said dumbbell-shaped iris; a microwave source closely-coupled to said waveguide section and producing said first wave; a pair of responsive means directionally responsive to the electric field of said modes and means for distorting said modes to produce electric fields of opposite direction in each connection with one mode and electric fields of the same direction in each connection with the other mode.

2. The waveguide hybrid junction according to claim 1 wherein said dumbbell-shaped iris extends transverse to the polarization direction of said first wave.

3. The waveguide hybrid junction according to claim 2 wherein said microwave source inciudes a klystron local oscillator having a rectangular output iris, and a coupling screw means adapted to be movably positioned within said output iris, the end of said coupling screw and one wall of said output iris forming a reactive coupling gap, said dumbbell-shaped iris being off-centered in the direction of said reactive coupling gap.

4. In combination; a microwave source and a microwave mixer adapted for close coupling to said microwave source; said mircowave mixer including a waveguide section capable of supporting a pair of orthogonally polarized dominant transverse electric waveguide modes established by first and second waves propagating, respectively, through a pair of junction connections adjoining said section; the junction connection for said first wave including a dumbbell-shaped iris for coupling the output frequency from said microwave source; a pair of diodes extending inwardly from opposed portions of the wall of said waveguide section, said diodes, being responsive to the polarization direction of said second wave; and means for perturbing the mode established by said first wave so that the electric field thereof extends in an opposite direction along the axis of each diode, said iris reducing spurious modes of oscillation within said klystron local oscillator and variations in diode current over the desired frequency range.

5. The combination according to claim 4 wherein said dumbbell-shaped iris extends transverse to the polarization direction of said first wave.

6. The combination according to claim 5 further including an attenuator strip transversely disposed across a portion of said dumbbell-shaped iris, said attenuator strip acting in conjunction with said dumbbell-shaped iris to attenuate said first wave to provide proper diode drive while not adversely affecting said second wave.

7. The combination according to claim 6 wherein said microwave source includes a klystron local oscillator having a rectangular output iris, and a coupling screw means adapted to be moveably positioned within said output iris, the end of said coupling screw and one wall of said output iris forming a reactive coupling gap, said dumbbell-shaped iris being off-centered in the direction of said reactive coupling gap.

8. The combination according to claim 7 wherein said attenuator means is a dielectric body coated within a thin film of conductive material.

9. The combination according to claim 8 wherein said dielectric body means is made of mica.

10. In a waveguide hybrid junction; a waveguide section capable of supporting a pair of orthogonally polarized dominant transverse electric waveguide modes established by first and second waves propagating, respectively, through a pair of junction connections adjoining said section, the junction connection for said first wave including a thin-walled iris structure with a small opening elongated in the polarization direction of said first wave; a microwave source producing said first wave; said iris structure including an attenuator strip transversely and fixedly disposed across said iris opening on the wall of said iris structure interior of said waveguide section, said attenuator means adapted being for close coupling of said hybrid juiction to said microwave source while reducing spurious modes of oscillation within said microwave source; a pair of diodes extending inwardly from opposed portions of the wall of said waveguide section, said diodes responsive to the polarization direction of said second wave; and means for perturbing the mode established by said first wave so that the electric field thereof extends in an opposite direction along the axis of each diode, said iris in conjunction with said attenuator strip further acting to reduce variations in diode current over the desired frequency range.

11. The waveguide hybrid junction according to claim 10 wherein said iris structure has a dumbbell-shaped opening, said attenuator strip being transversely disposed across the central portion of said dumbbell-shaped opening, said attenuator strip acting in conjunction with said dumbbell-shaped iris to attenuate said first wave to provide proper diode drive while not adversely affecting said second wave.

12. The waveguide hybrid junction according to claim 11 wherein said microwave source includes a klystron local oscillator having a rectangular output iris, and a coupling screw means adapted to be moveably positioned within said output iris, the end of said coupling screw and one wall of said output iris forming a reactive coupling gap, said dumbbell-shaped iris opening having its longitudinal axis off centered with respect to the center line of said output iris normal to the polarization direction of said first wave, said dumbbell-shaped iris opening being off centered in the direction of said reactive coupling gap.

13. The waveguide hybrid junction according to claim 10 wherein said attenuator strip is coated with a thin film of conductive material.

14. The waveguide hybrid junction according to claim 13 wherein said attenuator strip is made of mica.

References Cited in the file of this patent

UNITED STATES PATENTS

| | | |
|---|---|---|
| 2,501,052 | Herlin | Mar. 21, 1950 |
| 2,787,711 | Glass | Apr. 2, 1957 |
| 2,813,972 | Anderson et al. | Nov. 19, 1957 |

UNITED STATES PATENT OFFICE
CERTIFICATE OF CORRECTION

Patent No. 3,158,811                                        November 24, 1964

Bernard M. Schiffman

It is hereby certified that error appears in the above numbered patent requiring correction and that the said Letters Patent should read as corrected below.

Column 1, line 33, for "reflux" read -- reflex --; column 3, line 69, for "an dnormal" read -- and normal --; column 5, line 21, for "within" read -- with --; line 37, for "adapted being" read -- being adapted --; line 38, for "juiction" read -- junction --.

Signed and sealed this 6th day of April 1965.

(SEAL)
Attest:

ERNEST W. SWIDER                                          EDWARD J. BRENNER
Attesting Officer                                            Commissioner of Patents